Aug. 9, 1932.  C. S. BROWN  1,870,892

ROLLER BEARING CONSTRUCTION

Filed April 23, 1930

INVENTOR.
Charles S. Brown
BY
Bidell & Thompson
ATTORNEYS.

Patented Aug. 9, 1932

1,870,892

UNITED STATES PATENT OFFICE

CHARLES S. BROWN, OF SYRACUSE, NEW YORK

ROLLER BEARING CONSTRUCTION

Application filed April 23, 1930. Serial No. 446,671.

This invention relates to roller bearings, and has for its object, a particularly simple, efficient and economical construction of the cage and the rollers, whereby the rollers are held in the cage by means on the cage and interlocking with the ends of the rollers.

The invention consists in the novel features and in the combinations and constructions hereinafter set forth and claimed.

In describing this invention, reference is had to the accompanying drawing in which like characters designate corresponding parts in all the views.

Figure 1:
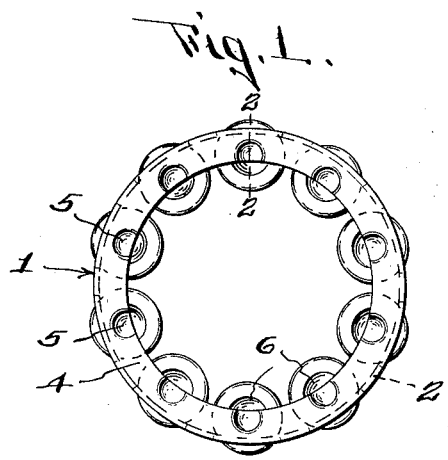
Figure 1 is an end elevation of a roller bearing embodying my invention.
Figure 2:
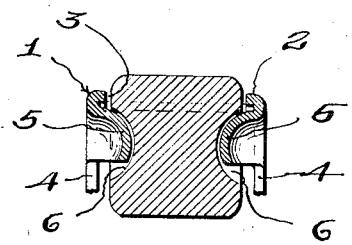
Figure 2 is an enlarged sectional view on line 2—2, Figure 1.

1 designates the cage which is formed up of sheet metal to have a cylindrical wall 2 formed with roller receiving slots 3, and means at the edges of the cylindrical wall and extending radially inwardly therefrom for coacting with the ends of the rollers to hold the rollers from displacement. In the illustrated embodiment of my invention, this means consists of annular flanges 4 extending inwardly from the margins of the cylindrical wall 2 formed integral therewith, these flanges having spaced apart members 5 at intervals for coacting with the ends of the rollers. Preferably, the ends of the rollers and said members are formed with complemental projections and recesses, and as here shown, the members 5 formed on the flanges are spherically convex and nest into spherical recesses 6 arranged in the ends of the rollers coaxially thereof.

Figure 3:
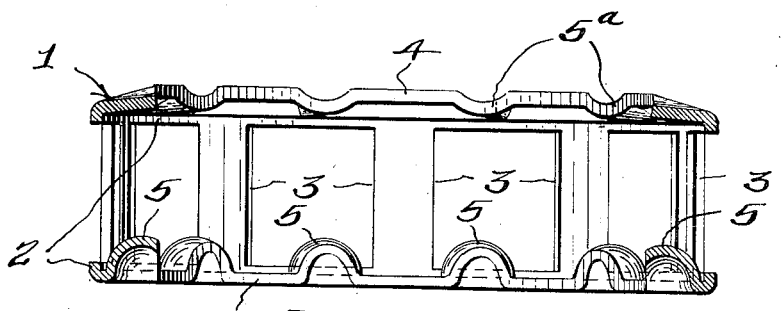
Figure 3 is a sectional view of the cage before the rollers are assembled thereon.

The cage is formed up of sheet metal by any suitable forming process. It is preferably formed by stamping and drawing operations into the form shown in Figure 3, wherein one of the flanges 4 is slightly displaced and either unprovided with the members 5, or with the members 5 partly formed therein as shown at 5ª. The members 5ª provide crimps for compensating for the surplus metal when the flange 4 is pressed into final position. After the rollers are inserted, the displaced flange is pressed into position and the members 5 formed therein, or if partly formed, are completed and pressed into the recesses of the rollers. These operations are performed when pressing the displaced flange 4 and forming or completing the members 5 therein. The ends of the rollers could constitute one set of the dies for forming the members 5, or completing the members 5ª in the displaced flange when assembling, the other set being on the tool for pressing the displaced flange into final position.

This bearing is extremely simple and economical to manufacture and in addition to the rollers consists of but one part.

What I claim is:

1. A roller bearing construction comprising a one piece metal cage formed of a cylindrical member having integral inwardly bent continuous annular side flanges, the portion of the tubular member between the side flanges forming a cylindrical wall and having roller receiving slots, the side flanges having projections formed therefrom from the excess metal provided by the turning in of the flanges from the circle of the cylindrical wall and the rollers being arranged between the side flanges and having recesses for receiving said projections.

2. A roller bearing construction comprising a one piece metal cage formed of a cylindrical member having integral inwardly bent continuous annular side flanges, the portion of the tubular member between the side flanges forming a cylindrical wall and having roller receiving slots, the side flanges having projections formed therefrom from the excess metal provided by the turning in of the flanges from the circle of the cylindrical wall and the rollers being arranged between the side flanges, the projections formed from the excess metal coacting with the rollers to hold them from displacement.

In testimony whereof, I have hereunto signed my name, at Syracuse, in the county of Onondaga, and State of New York, this 21st day of April, 1930.

CHARLES S. BROWN.